J. PFITZENMEIER.
Mechanical Movement.
No. 220,305. Patented Oct. 7, 1879.
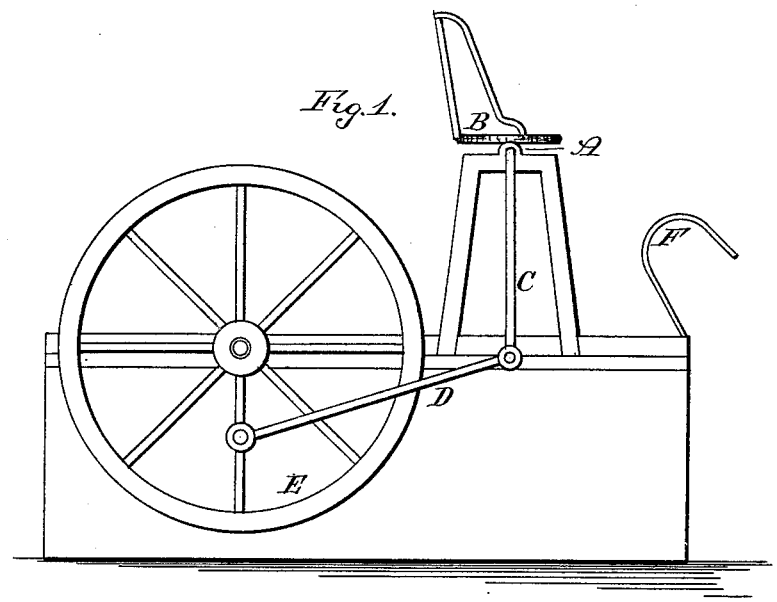
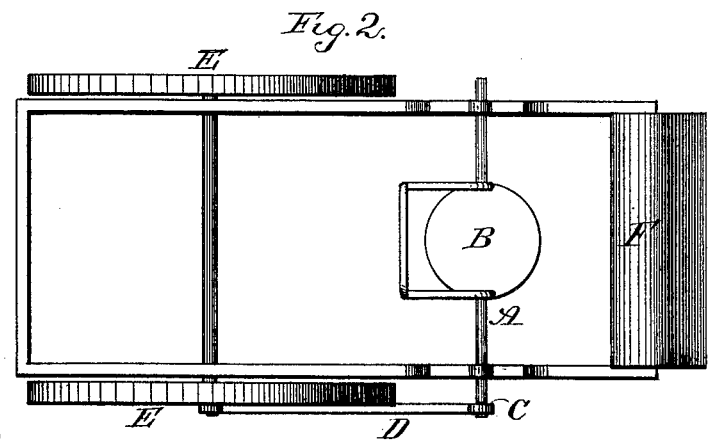

UNITED STATES PATENT OFFICE.

JOHN PFITZENMEIER, OF SHALER TOWNSHIP, ALLEGHENY COUNTY, PA.

IMPROVEMENT IN MECHANICAL MOVEMENTS.

Specification forming part of Letters Patent No. 220,305, dated October 7, 1879; application filed July 12, 1879.

*To all whom it may concern:*

Be it known that I, JOHN PFITZENMEIER, of Shaler township, in the county of Allegheny and State of Pennsylvania, have invented certain new and useful Improvements in Mechanical Movements; and I do hereby declare the following to be a full, clear, and exact description of the invention, such as will enable others skilled in the art to which it pertains to make and use it, reference being had to the accompanying drawings, which form part of this specification.

My invention relates to an improvement in mechanical movements, applicable to light machinery where no great motive power is required, such as velocipedes, sewing-machines, &c.; and it consists in attaching a seat to a rocking shaft that is connected by means of cranks and rods with the wheels of a machine, so that by throwing his weight alternately back and forward the operator upon the seat causes, by a rocking motion, the wheels to revolve, as will be fully described hereinafter.

The accompanying drawings represent my invention.

Figure 1 is a side elevation of my invention, and Fig. 2 is a plan view of the same.

Upon the rocking shaft A is rigidly secured the seat B, which seat projects equally forward and backward beyond the shaft sufficiently to facilitate a rocking motion when such is attempted by a person seated upon it.

The shaft A, supported by a suitable frame, is journaled at equidistant points from its middle, and terminates at one or both of its downward-bent ends in cranks C, which are connected by rods D with the wheels E between their circumference and center, so that by inclining the seat alternately back and forward a rotary motion is conveyed to the wheels by the rocking shaft, cranks, and rods. The rocking shaft A, however, may be without the cranks C at its ends, and the cranks instead attached in front or rear to the seat, wherever most convenient, and connected with wheels placed on a line with them, to produce the same effect as when at the ends of the shaft.

In front of the seat B, at a suitable height, is secured a foot-board, F, or other contrivance, against which the operator can brace himself to assist him in throwing his weight back and forward to maintain the rocking motion.

Having thus described my invention, I claim—

The combination of a rocking shaft, A, having the seat B secured thereto, and having the crank C secured to its end, with the connecting-rods D and fly-wheel E, the rocking motion of the seat being made to operate the wheel E, substantially as shown and described.

In testimony that I claim the foregoing I have hereunto set my hand this 9th day of July, 1879.

JOHN PFITZENMEIER.

Witnesses:
SAML. DIESCHER,
T. F. LEHMANN.